United States Patent
Bell et al.

(10) Patent No.: US 9,547,615 B2
(45) Date of Patent: Jan. 17, 2017

(54) PERIPHERAL PROTOCOL NEGOTIATION

(75) Inventors: Dennis M. Bell, Beaverton, OR (US); Stephen S. Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 13/977,822

(22) PCT Filed: Oct. 1, 2011

(86) PCT No.: PCT/US2011/054482
§ 371 (c)(1), (2), (4) Date: Nov. 25, 2013

(87) PCT Pub. No.: WO2013/048527
PCT Pub. Date: Apr. 4, 2013

(65) Prior Publication Data
US 2016/0117278 A1    Apr. 28, 2016

(51) Int. Cl.
G06F 13/00 (2006.01)
G06F 13/38 (2006.01)
G06F 13/14 (2006.01)
G06F 9/44 (2006.01)
G06F 13/42 (2006.01)

(52) U.S. Cl.
CPC ........... *G06F 13/387* (2013.01); *G06F 9/4413* (2013.01); *G06F 13/14* (2013.01); *G06F 13/38* (2013.01); *G06F 13/4221* (2013.01)

(58) Field of Classification Search
CPC ... G06F 13/387; G06F 9/4413; G06F 13/4221
See application file for complete search history.

(56) References Cited

U.S. PATENT DOCUMENTS

| | | | | |
|---|---|---|---|---|
| 5,841,985 A | * | 11/1998 | Jie | G06F 13/387 370/468 |
| 6,707,830 B1 | * | 3/2004 | Brown | H04Q 11/045 370/524 |
| 6,973,658 B2 | * | 12/2005 | Nguyen | G06F 9/4411 710/104 |

(Continued)

FOREIGN PATENT DOCUMENTS

CN      102138134      7/2011
WO      2013/048527 A1      4/2013

OTHER PUBLICATIONS

Office Action received for Taiwan Patent Application No. 101136209, mailed on Oct. 28, 2014, 16 pages including 7 pages of English translation.

(Continued)

*Primary Examiner* — Jing-Yih Shyu
(74) *Attorney, Agent, or Firm* — Jordan IP Law, LLC

(57) ABSTRACT

Systems and methods of operating a computing system may involve utilizing at least one of a peripheral protocol negotiation and a universal connector to determine a peripheral device protocol, and reconfiguring a computer device to accommodate that peripheral device protocol. Upon such a reconfiguration, the peripheral protocol negotiation may "step aside", and one or more subsequent communications between a host computer and the peripheral device utilizing the peripheral device protocol may start.

27 Claims, 4 Drawing Sheets

(56) References Cited

U.S. PATENT DOCUMENTS

| | | | |
|---|---|---|---|
| 7,412,553 B2* | 8/2008 | Morrow | G06F 13/387 710/105 |
| 7,440,287 B1 | 10/2008 | Ni et al. | |
| 2005/0251589 A1* | 11/2005 | Wang | G06F 21/31 710/5 |
| 2006/0294272 A1* | 12/2006 | Chou | G06K 19/07732 710/62 |
| 2007/0073893 A1* | 3/2007 | Gajo | G06F 13/387 709/230 |
| 2007/0167069 A1* | 7/2007 | Murakami | H01R 13/641 439/502 |
| 2009/0182910 A1* | 7/2009 | Huang | G06F 9/4411 710/63 |
| 2009/0293071 A1* | 11/2009 | Huang | G06F 9/4413 719/327 |
| 2010/0049885 A1* | 2/2010 | Chandra | H04L 45/62 710/36 |
| 2011/0040900 A1 | 2/2011 | Yepez et al. | |

OTHER PUBLICATIONS

International Preliminary Report on Patentability and Written Opinion received for PCT Patent Application No. PCT/US2011/054482, mailed on Apr. 10, 2014, 8 pages.

International Search Report and Written Opinion received for PCT application No. PCT/US2011/054482, mailed on May 22, 2012, 16 pages.

* cited by examiner

PERIPHERAL PROTOCOL NEGOTIATION

BACKGROUND

Technical Field

Embodiments generally relate to standardized universal connectors. More particularly, embodiments relate to utilizing at least one of a peripheral protocol negotiation and a universal connector to accommodate different input/output (I/O) protocol types.

Discussion

A challenge of designing host devices (e.g., computers, mobile phones) and peripheral devices (e.g., flash drives, audio/video devices) may relate to I/O protocols. Specifically, the prevalence of numerous I/O protocols may require device manufacturers to guess what other device manufacturers and consumers may prefer. In response, device manufacturers often provide a number of connectors to accommodate multiple protocols. This may lead to unnecessary expansion in device form factors.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
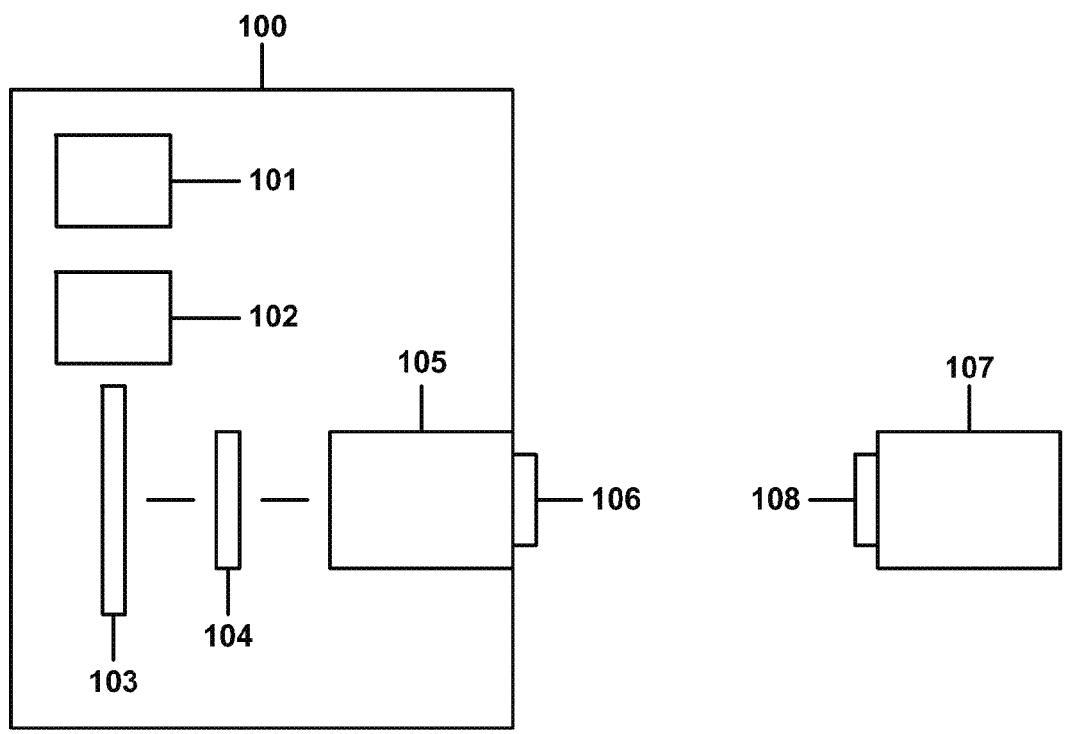
FIG. 1 is a block diagram of an example of a computing system including a standardized universal connector in accordance with an embodiment of the invention.

Embodiments may involve a computer implemented including detecting a coupling of a peripheral device to a host device and implementing a peripheral protocol negotiation, wherein the peripheral protocol negotiation includes transmitting a query communication including a query of a peripheral device protocol. The peripheral protocol negotiation may also provide for transmitting a return communication indicating the peripheral device protocol, reconfiguring the host device to accommodate the peripheral device protocol, and directing the peripheral protocol negotiation to step aside. Moreover, the method can include using the peripheral device protocol to conduct one or more subsequent communications between the host device and the peripheral device.

Furthermore, embodiments may include a computer readable storage medium including a set of instructions which, if executed by a processor, cause a computer to detect a coupling of a peripheral device to a host device, and transmit a query communication including a query of a peripheral device protocol. The instructions may also cause a computer to receive a return communication indicating the peripheral device protocol, reconfigure the host device to accommodate the peripheral device protocol, and use the peripheral device protocol to conduct one or more subsequent communications with the peripheral device.

In addition, embodiments may include a computer readable storage medium including a set of instructions which, if executed by a processor, cause a computer to receive, at a peripheral device, a query communication including a query of a peripheral device protocol, and transmit a return communication indicating the peripheral device protocol. The instructions may also cause a computer to initiate one or more subsequent communications with a host device utilizing a peripheral device protocol.

Embodiments may also include an apparatus including a plurality of contacts a physical layer coupled to the plurality of contacts. The apparatus may also include logic to detect a coupling of a peripheral device to a host device, transmit a query communication including a query of a peripheral device protocol, receive a return communication indicating the peripheral device protocol, reconfigure the host device to accommodate the peripheral device protocol, and initiate communication with the peripheral device utilizing the peripheral device protocol.

Additional embodiments may include a system including a processor, a memory, a connecting bus, and a connector apparatus having a plurality of contacts, and a physical layer coupled to the plurality of contacts. The system may also include logic to detect a coupling of a peripheral device to a host device, transmit a query communication including a query of a peripheral device protocol, and receive a return communication indicating the peripheral device protocol. The logic can also reconfigure the host device to accommodate the peripheral device protocol, and initiate one or more subsequent communications with the peripheral device utilizing the peripheral device protocol.

Turning now to FIG. 1, a block diagram of a computer system including a host device 100 and peripheral device 107 is shown. The host computer 100 may include a processor such as a central processing unit (CPU) 101, memory 102, a connecting bus 103, a peripheral device driver 104, and a standardized universal connector (SUC) 105. In the illustrated example, the SUC 105 includes an SUC port 106, and the peripheral device 107 includes a device port 108. The peripheral device 107 may utilize the device port 108 to connect to the host computer 100 through the SUC port 106.

The SUC 105 and the peripheral device 107 may implement a peripheral protocol negotiation upon detection of the coupling of the peripheral device 107 to the host device 100 (e.g., during start-up, reboot, or plug-in). As will be discussed in greater detail, the peripheral protocol negotiation may include determining a peripheral device protocol and reconfiguring the host device to accommodate that peripheral device protocol.

The peripheral protocol negotiation may be standardized (i.e., it executes without regard to peripheral device protocol) or not. In addition, the peripheral protocol negotiation may be configured to operate as a preamble, in that it may initiate and complete prior to opening communication between the host device and the peripheral device. Moreover, during the implementation of the peripheral protocol negotiation the normal operation of the host device and the peripheral device may be suspended. The host device and the peripheral device may remain unaware of the peripheral protocol negotiation during its implementation as well. Upon completion of the peripheral protocol negotiation, the peripheral protocol negotiation may "step aside", communication between the host device 100 and the peripheral device 107 may be opened, and an unmodified peripheral device protocol driver, such as the peripheral device driver 104, of the peripheral device 107 may be initiated.

Figure 2:
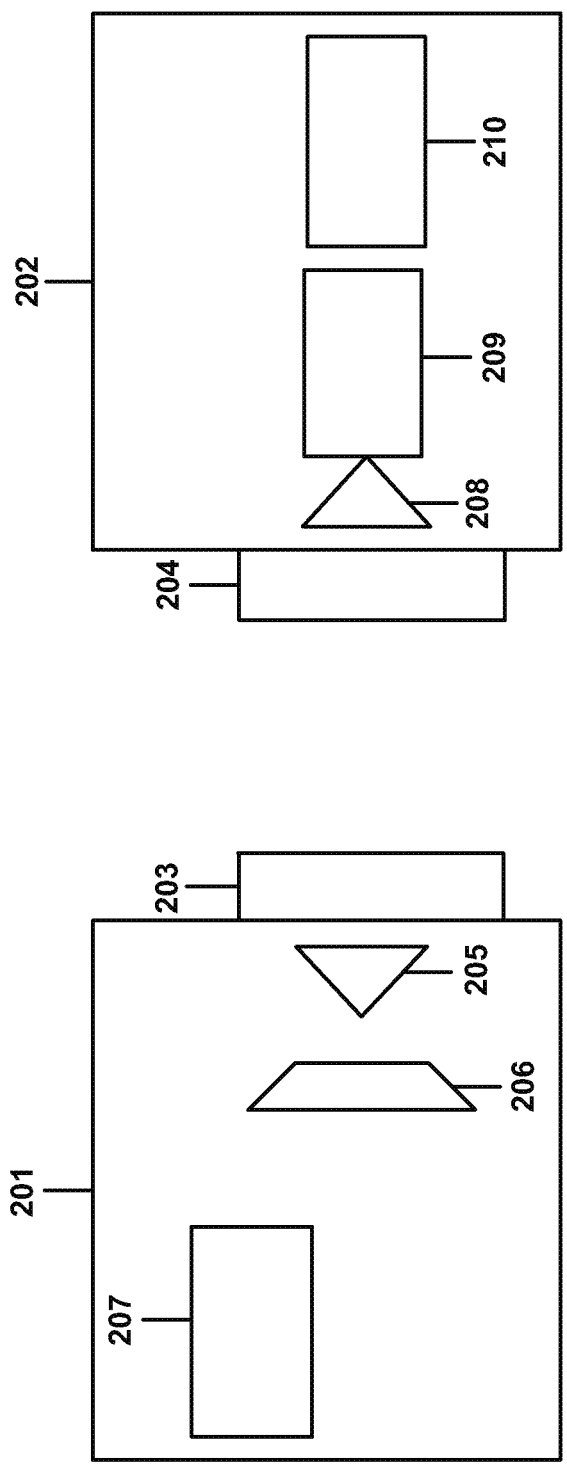
FIG. 2 is a block diagram of an example of a standardized universal connector apparatus in accordance with an embodiment of the invention.

Turning now to FIG. 2, a more detailed block diagram of a host apparatus including an SUC 201 and peripheral device 202 is shown. The SUC 201 may include an SUC connecting port 203, a host-side universal common physical layer (PHY) 205, a multiplexer (MUX) 206, and a host-side protocol negotiation front-end 207. The SUC 201 and the peripheral device 202 may be coupled to one another through the SUC connecting port 203.

The SUC connecting port 203 may support multiple I/O protocols, in that it may include sufficient electrical pins to attach and electrically couple an I/O protocol that requires the greatest number of pins. For example, a protocol such as the DisplayPort (DP, e.g., Embedded DisplayPort (eDP) Standard Version 1.3, January 2011, Video Electronics Standards Association) standard requires more pins than the Universal Serial Bus (USB, e.g., USB Specification 3.0, Rev. 1.0, Nov. 12, 2008, USB Implementers Forum) standard, so the SUC connecting port 203 may be designed to include sufficient pins to support the DisplayPort standard.

The host-side universal common PHY 205 may include electrical coupling components (e.g., cables, wires, fiber) that may define the relationship of a host device, such as the host device 100 (FIG. 1) to a transmission medium as pertaining to transmission of an electrical signal. In the illustrated example, the host-side universal common PHY 205 may couple the SUC connecting port 203 to other portions of the SUC 201. The MUX 206 may be a multiplexer device that, upon receiving indication of the operating protocol of the peripheral device 202 (as described further below), may reconfigure contacts on the SUC connecting port 203 to accommodate that operating protocol. As will be discussed in greater detail, the host-side protocol negotiation front-end 207 may include logic (e.g., silicon) that may implement a device protocol negotiation to determine the appropriate peripheral device protocol.

The peripheral device 202 may include a device-side connecting port 204, a device-side universal common PHY 208, a device-side protocol negotiation front-end 209, and peripheral device logic 210. The device-side connecting port 204 may be utilized to couple the SUC 201 and the peripheral device 202 to one another. Similar to the host-side universal common PHY 205, the device-side universal common PHY 208 may couple the device-side connecting port 204 to other portions of the peripheral device 202. Also, similar to the host-side protocol negotiation front-end 207, the device-side protocol negotiation front-end 209 may include logic to implement a peripheral protocol negotiation to determine an appropriate peripheral device protocol (as will be discussed in greater detail). The peripheral device 202 may also include its normal peripheral device logic 210 (e.g., High-Definition Multimedia Interface (HDMI), version 1.4).

Figure 3:
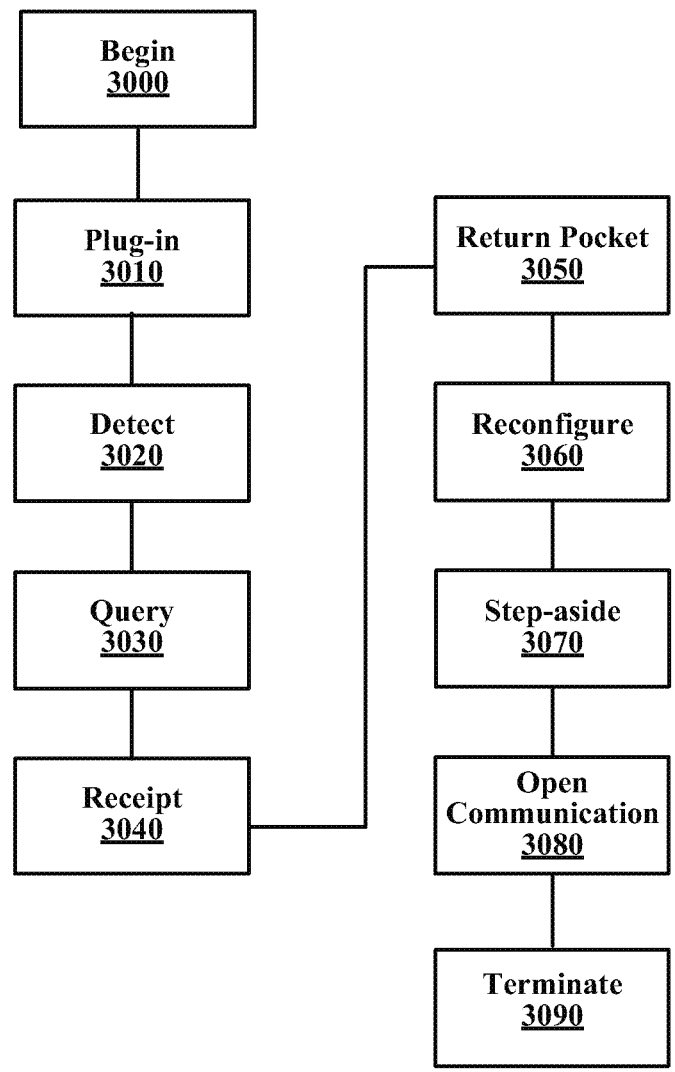
FIG. 3 is a flowchart of an example of a method that utilizes a standardized universal connector to implement a peripheral protocol negotiation between host and a peripheral device in accordance with an embodiment of the invention.

Turning now to FIG. 3, a flowchart of an exemplary method of utilizing a standardized universal connector to implement a peripheral protocol negotiation between a host device, such as the host device 100 (FIG. 1), and a peripheral device, such as the peripheral device 107 (FIG. 1), according to one embodiment of the present invention is shown. In this example, the peripheral device may utilize a protocol such as, for example, the HDMI protocol. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 3000. At processing block 3010, the peripheral device may be coupled to the host device including an SUC, such as the SUC 201 (FIG. 2). At processing block 3020, host-side protocol negotiation front-end logic, such as the host-side protocol negotiation front-end 207, (FIG. 2) may initiate signaling to detect the presence (e.g., plug-in) of the peripheral device. At processing block 3030, upon detection of the peripheral device, the host-side protocol negotiation front-end logic may transmit a query communication to determine the protocol (HDMI) of the coupled peripheral device.

At processing block 3040, the query communication may be received by device-side protocol negotiation front-end logic, such as the device-side protocol negotiation front-end 209 (FIG. 2). At processing block 3050, the device-side protocol negotiation front-end logic may transmit a return communication indicating the peripheral device protocol (e.g., HDMI). At processing block 3060, upon receipt of the return communication, the host-side protocol negotiation front-end logic may direct a MUX, such as the MUX 206 (FIG. 2) to reconfigure contacts on SUC connecting port, such as SUC connecting port 203 (FIG. 2) from a current configuration (e.g., a default configuration) a configuration that complies with the peripheral device protocol (HDMI).

If, on the other hand, the host-side protocol negotiation front-end logic recognizes the peripheral device protocol as a protocol not supported by the host device, the peripheral device may remain unaware of the host device and no connection will be made. From the host side, the host-side protocol negotiation front-end logic may either ignore the peripheral device and do nothing, or ignore the peripheral device and report to the host device CPU, such as the host device CPU 101 (FIG. 1), that an unsupported device has been attached. At this point, the process may terminate.

Otherwise, the process continues to processing block 3070, the peripheral protocol negotiation implemented between the SUC and the peripheral device may step aside, and a host driver on the host device may detect the peripheral device through a normal hot-plug procedure. At processing block 3080, communication between the host device and the peripheral device using the peripheral device protocol (e.g., HDMI) may be initiated. At processing block 3090, the process may then terminate.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations. One such exemplary variation is described below.

In some cases, SUCs according to the present invention may have difficulty in accommodating legacy protocols utilizing legacy protocol connectors. Specifically, host-side SUC connecting ports may not be able to couple to legacy device ports, and legacy protocol connectors may not be configured to implement a peripheral protocol negotiation as described herein. In these cases, embodiments of the present invention ma include a dangle to couple a host device and a peripheral device, and aid in implementing the peripheral protocol negotiation.

Figure 4:
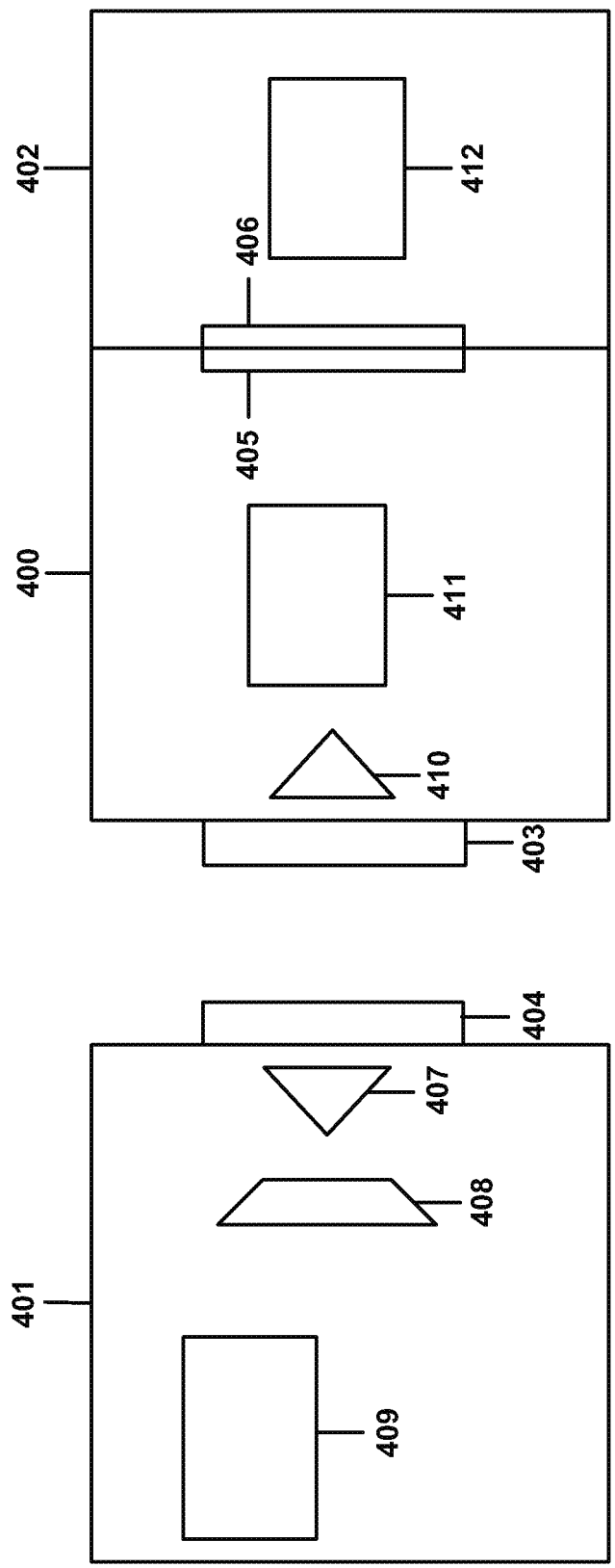
FIG. 4 is a mock diagram of an example of an apparatus including a standardized universal connector dongle in accordance with an embodiment of the invention.

FIG. 4 illustrates a block diagram of a dongle 400, a SUC 401, and a legacy peripheral device 402. In this embodiment, the dongle 400 may include a host-side dongle connector 403 and a device-side dongle connector 405. The dangle 400 may also include dongle universal common PHY 410 and dongle-side protocol negotiation front-end logic 411. The SUC 401 may include an SUC-connector port 404. Similar to the embodiment described in FIG. 2, the SUC 401 may also include a host-side universal common PHY 407, a MUX 408, and a host-side protocol negotiation front-end 409. The legacy peripheral device 402 may include legacy device logic 412, and may also include legacy device-side connecting port 406.

The dongle-side protocol negotiation front-end 411 may communicate with the host-side protocol negotiation front-end 409 through the universal common PHY(s) 410, 407 to implement s the peripheral protocol negotiation. As discussed above, the legacy peripheral device 402 may remain oblivious to execution of a protocol negotiation (i.e., the legacy peripheral device may be isolated from and unaware of the host device) until the MUX 408 reconfigures the contacts in the device-side dongle connector 405, and the dongle-side protocol negotiation front-end 411 couples the dongle universal common PHY 410 to the legacy peripheral device 402. At this point, the host SUC 401 and the legacy peripheral device 402 may acknowledge each other, and communication may open.

A drawback of utilizing legacy protocols may be that each protocol operates on a different voltage (differential signaling ranges from 350 mV to 1.2V). An SUC implementing a peripheral protocol negotiation according to embodiments of the present invention may enable the implementation of a standard (ideally low) voltage swing. Operating with a standardized low voltage swing may enable the peripheral device and host device to run with lower power requirements and faster speeds. Moreover, a dongle, such as dongle 400 (FIG. 4) could convert up to an older, legacy voltage swing if necessary to interface with a legacy peripheral device, such as legacy peripheral device 402 (FIG. 4), and implement a standard voltage swing.

In addition, an SUC implementing a peripheral protocol negotiation according to embodiments of the present invention may enable use of smaller connector form factors. Specifically, embodiments of the present invention may consolidate connection of different I/O types (e.g., HDMI) into a single, small (e.g., low-profile, ultra-thin) connector form factor.

It will be evident to persons having the benefit of this disclosure that various modifications and changes may be made to these embodiments without departing from the broader spirit and scope of the embodiments described, herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to tire same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in block diagram form in order to avoid obscuring embodiments of tire invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

We claim:

1. A method comprising:
   detecting a coupling of a peripheral device to a host device, wherein the peripheral device includes a device port coupled to the host device through a port of a universal connector having a plurality of contacts supporting at least a DisplayPort protocol;
   implementing a peripheral protocol negotiation using the universal connector, including:
      transmitting a query communication including a query of a peripheral device protocol;
      transmitting a return communication indicating the peripheral device protocol;
      reconfiguring the host device to accommodate the peripheral device protocol using a multiplexer of the universal connector; and
      directing the peripheral protocol negotiation to step aside; and
   using the peripheral device protocol to conduct one or more subsequent communications between the peripheral device and the host device.

2. The method of claim 1, wherein the plurality of contacts are reconfigured from a current configuration to a configuration of the peripheral device protocol.

3. The method of claim 1, wherein the peripheral protocol negotiation further includes suspending normal operation of the peripheral device and the host device.

4. The method of claim 1, wherein a peripheral device protocol driver remains unmodified by the peripheral protocol negotiation, and the peripheral device executes according to the peripheral device protocol driver after the peripheral protocol negotiation steps aside.

5. The method of claim 1, wherein the host device and the peripheral device are unaware of the implementation of the peripheral protocol negotiation prior to the peripheral protocol negotiation stepping aside.

6. The method of claim 1, wherein the peripheral protocol negotiation executes without regard to the peripheral device protocol.

7. The method of claim 1, further including detecting a coupling of a dongle to the host device and to the peripheral device to implement the peripheral protocol negotiation.

8. The method of claim 1, wherein detection of the coupling of the peripheral device is a result of at least one of a start-up of the host device, a reboot of the host device, and a plug-in of the peripheral device to the host device.

9. A non-transitory computer readable storage medium comprising a set of instructions which, if executed by a processor, cause a computer to:
detect a coupling of a peripheral device to a host device, wherein the peripheral device is to include a device port coupled to the host device through a port of a universal connector having a plurality of contacts supporting at least a DisplayPort protocol;
using the universal connector,
transmit a query communication including a query of a peripheral device protocol;
receive a return communication indicating the peripheral device protocol;
reconfigure the host device to accommodate the peripheral device protocol using a multiplexer of the universal connector; and
use the peripheral device protocol to conduct one or more subsequent communications between the peripheral device and the host device.

10. The medium of claim 9, wherein the plurality of contacts are to be reconfigured from a current configuration to a configuration of the peripheral device protocol.

11. The medium of claim 9, wherein a peripheral device protocol driver is to remain unmodified, and the peripheral device is to execute according to the peripheral device protocol driver after the peripheral protocol negotiation steps aside.

12. The medium of claim 9, wherein, if executed, the set of instructions cause a computer to detect a coupling of a dongle to the host device and to the peripheral device.

13. The medium of claim 9, wherein the detection of the coupling of the peripheral device is a result of at least one of a start-up of the host device, a reboot of the host device, and a plug-in of the peripheral device to the host device.

14. A non-transitory computer readable storage medium comprising a set of instructions which, if executed by a processor, cause a computer to:
receive, at a peripheral device coupled to the computer, a query communication including a query of a peripheral device protocol, wherein the peripheral device is to include a device port coupled to the computer through a port of a universal connector having a plurality of contacts supporting at least a DisplayPort protocol;
use the universal connector to
transmit a return communication indicating the peripheral device protocol;
reconfigure the computer to accommodate the peripheral device protocol using a multiplexer of the universal connector; and
initiate one or more subsequent communications with a host device utilizing the peripheral device protocol.

15. The medium of claim 14, wherein, if executed, the set of instructions receive the query communication, transmit the return communication and initiate one or more subsequent communications with the host device without modification to a peripheral device protocol driver.

16. The medium of claim 14, wherein, if executed, the set of instructions cause a computer to suspend normal operation of the peripheral device.

17. The medium of claim 14, wherein, if executed, the set of instructions receive the query communication, transmit the return communication and initiate of the one or more subsequent communications with the host device execute without regard to the peripheral device protocol.

18. An apparatus comprising:
a universal connector comprising a plurality of contacts to support at least a DisplayPort protocol;
a physical layer coupled to the plurality of contacts; and
logic to,
detect a coupling of a peripheral device to a host device;
transmit a query communication including a query of a peripheral device protocol;
receive a return communication indicating the peripheral device protocol;
reconfigure the host device to accommodate the peripheral device protocol conducted by a multiplexer of the universal connector; and
initiate one or more subsequent communications with the peripheral device utilizing the peripheral device protocol.

19. The apparatus of claim 18, wherein the plurality of contacts are to be reconfigured from a current configuration to a configuration of the peripheral device protocol.

20. The apparatus of claim 18, wherein a peripheral device protocol driver remains unmodified, and the peripheral device is to execute according to the peripheral device protocol driver after the peripheral protocol negotiation steps aside.

21. The apparatus of claim 18, wherein the logic is to detect a coupling of a dongle to the host device and to the peripheral device.

22. The apparatus of claim 18, wherein the detection of the coupling of the peripheral device is a result of one of a start-up of the host device, a reboot of the host device, and a plug-in of the peripheral device to the host device.

23. A system comprising:
a processor;
a memory;
a connecting bus; and
a universal connector apparatus including:
a plurality of contacts;
a physical layer coupled to the plurality of contacts to support at least a DisplayPort protocol; and
logic to,
detect a coupling of a peripheral device to a host device;

transmit a query communication including a query of a peripheral device protocol;

receive a return communication indicating the peripheral device protocol;

reconfigure the host device to accommodate the peripheral device protocol conducted by a multiplexer of the universal connector; and initiate one or more subsequent communications with the peripheral device utilizing the peripheral device protocol.

24. The system of claim 23, wherein the plurality of contacts are to be reconfigured from a current configuration to a configuration of the peripheral device protocol.

25. The system of claim 23, wherein a peripheral device protocol driver remains unmodified, and the peripheral device is to execute according to the peripheral device protocol driver after the peripheral protocol negotiation steps aside.

26. The system of claim 23, wherein the logic is to detect a coupling of a dongle to the host device and to the peripheral device.

27. The system of claim 23, wherein the detection of the coupling of the peripheral device is a result of one of a start-up of the host device, a reboot of the host device, and a plug-in of the peripheral device to the host device.

* * * * *